United States Patent [19]

Goldman

[11] 4,372,073
[45] Feb. 8, 1983

[54] FISHING TACKLE STORAGE APPARATUS

[76] Inventor: Sidney M. Goldman, 401 Webster, Chicago, Ill. 60614

[21] Appl. No.: 288,064

[22] Filed: Jul. 29, 1981

[51] Int. Cl.³ ............................................. A01K 97/06
[52] U.S. Cl. ...................................... 43/57.1; 224/920
[58] Field of Search .......... 43/54.5 R, 57.5 R, 57.5 A; 224/920

[56] References Cited

U.S. PATENT DOCUMENTS

| | | | |
|---|---|---|---|
| 1,711,677 | 5/1929 | Hansen | 43/57.5 R |
| 2,600,665 | 6/1952 | Lester | 43/57.5 |
| 2,659,997 | 11/1953 | Guestinger | 43/57.5 |
| 2,723,485 | 11/1955 | Pederson | 43/57.5 R |
| 2,823,971 | 2/1958 | Hoyt | 43/54.5 R |
| 2,927,395 | 3/1960 | Bartlett | 43/57.5 |
| 3,122,854 | 3/1964 | Boertlein | 43/57.5 R |
| 3,377,737 | 4/1968 | Campbell | 43/57.5 R |
| 3,678,611 | 7/1972 | Files | 43/54.5 R |
| 3,747,258 | 7/1973 | Maciel | 43/57.5 R |
| 4,040,202 | 8/1977 | Wille | 43/57.5 A |
| 4,186,511 | 2/1980 | Slacter | 43/57.5 A |
| 4,203,245 | 5/1980 | Peterson | 43/25.2 |

FOREIGN PATENT DOCUMENTS

| | | | |
|---|---|---|---|
| 588101 | 10/1924 | France | 43/57.5 R |
| 3025 | 2/1909 | United Kingdom | 43/57.5 R |

OTHER PUBLICATIONS

Photocopy of sales receipt for one "Tackle Roll or Fly Roll," purchased on 6/1/81 but which has been sold more than 1 year prior to applicant's filing date by Clearing Marine, Chicago, Ill.

Brochure distributed at 1981 Atlanta Super Outdoor Show held Aug. 6-9, 1981 showing "Tackle Caddy," (p. 77).

Pamphlet distributed at 1981 Atlanta Super Outdoor Show held Aug. 6-9, 1981 showing "Fly Book" and Fly Pocket.

*Primary Examiner*—Nicholas P. Godici
*Assistant Examiner*—M. Jordan
*Attorney, Agent, or Firm*—Fitch, Even, Tabin, Flannery & Welsh

[57] ABSTRACT

An improved fishing tackle storage apparatus having a lure mounting pad fabricated from a sheet of foamed elastomeric material adapted for detachably receiving the hook of a hook-type fishing lure and having a protective cover flap substantially resistant to hook penetration adapted to cover the lure mounting pad and associated hooks. The apparatus is made compact for transport by rolling into a cylindrical shape.

11 Claims, 6 Drawing Figures

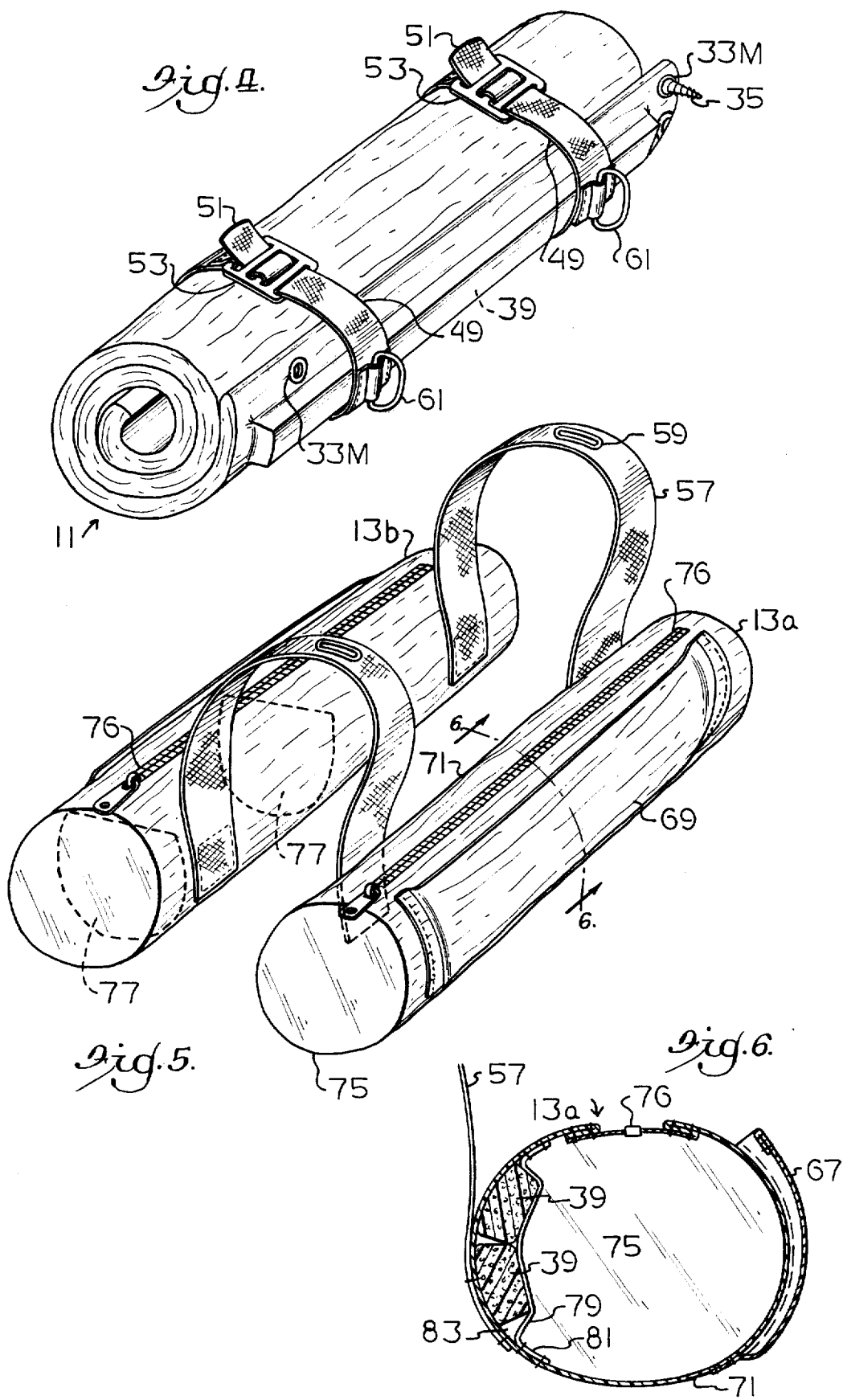

FISHING TACKLE STORAGE APPARATUS

BACKGROUND OF THE INVENTION

1. Field of the Invention

The present invention relates generally to fishing tackle storage apparatus, and more particularly to such an apparatus which may be rolled compact for convenient transport and is buoyant to provide for easy retrieval in case of accidental loss in water.

2. Description of the Prior Art

For many years sport fishermen have used various types of compartmentalized boxes and other apparatus for storing fishing lures and other fishing tackle such as weights, leaders, reels and line. The boxes are generally constructed of metal or a rigid plastic material and have hinged lids that open to reveal an array of compartments generally formed in trays and which receive the lures, leaders and weights. A larger storage compartment is generally provided underneath the trays for storing larger items such as reels and the like. These tackle boxes have the drawback that if they accidentally fall into a lake or river, they quickly sink or remain buoyant only so long as no water has entered the interior of the tackle box. While fishing, the tackle box must be left open in order to display the tackle to the fisherman. Thus, if the tackle box is accidentally dropped into a river or lake, the tackle as well as the box is often times irretrievable. Also, a large struggling fish landed by the fisherman can readily upset a tackle box and spill its contents.

Other types of fishing tackle storage apparatus, designed generally to hold only lures and hooks, have been developed. One such apparatus is disclosed in U.S. Pat. No. 4,186,511 to Slacter and includes a lure box having a block of elastomeric material into which the hooks of fishing lures are removably inserted. The lure box disclosed in the Slacter patent has the disadvantage that it lacks a protective covering for the mounted lures so that a boat occupant can be injured merely by brushing against an exposed hook. Also, while the Slacter patent discloses the use of an elastomeric material adapted for receiving the hooks of lures, the preferred elastomeric material is stated to be foam rubber. Foam rubber has the disadvantage that it has an open cell structure and therefore has a high degree of water absorbency which works against flotation if accidentally dropped in water. Additionally, the lure box disclosed by Slacter has a rigid frame preventing it from being folded into a compact shape. It is therefore cumbersome and awkward to transport particularly since hooks from mounted lures remain exposed.

Another type of known fishing tackle storage apparatus, called a "tackle roll," also designed primarily for holding only fishing lures, generally comprises a pad of foam rubber having one side affixed to a vinyl backing and its other side covered by a clear vinyl protective flap. The fishing lures are mounted by detachable engagement of their hooks with the foam rubber. Means are provided for vertically hanging the tackle roll on the side of a boat so that the lures are displayed to the fisherman. The tackle roll may be rolled into a generally cylindrical shape and secured by means of ties during non-use. The tackle roll, however, has several major drawbacks. As aforementioned, foam rubber has an open cell structure and therefore readily absorbs water and loses its buoyancy. Thus, a tackle roll containing fishing lures can quickly sink if accidentally dropped in water. As another drawback, foam rubber readily tears so that the tackle roll has a very limited useful life due to the fact that the hooks of the lures are often inserted past the barb. Also, the tackle roll is adapted for storing only lures and not other fishing tackle such as reels, extra line or sinkers. Furthermore, when the tackle roll is hung on the side of a boat, a fishing lure may work its way loose from the foam rubber pad and fall to the bottom of the boat creating a hazard for occupants of the boat.

BRIEF SUMMARY OF THE INVENTION

In accordance with the present invention, an improved fishing tackle storage apparatus is provided that will remain buoyant so as to be easily retrievable if accidentally dropped in water. The preferred apparatus includes a lure caddy and a pair of auxiliary tackle receptacles.

The lure caddy is rollable into a compact cylindrical shape that is secured by means of straps for transport and storage. The lure caddy includes a lure mounting pad fabricated from foamed elastomeric flotation material having a closed cell structure. The lure mounting pad is adapted for detachably receiving at least one hook of a hook-type fishing lure so as to enable mounting of the lure. In a preferred embodiment, means are provided for mounting the unrolled lure caddy in a substantially vertical position, for example, from the gunwale of a boat. A protective cover flap, preferably of clear vinyl, is provided to selectively cover the lure pad and associated hooks, thus allowing the fisherman to view the mounted lures yet be protected from the mounted hooks. The back side of the lure mounting pad is preferably affixed to a soil- and water-resistant backing having a bottom panel that is foldable over the vinyl covering to form a gutter. In the event the hook from a mounted lure works loose from the lure mounting pad, the gutter prevents the lure from falling from the lure caddy. Additional tackle pockets for holding other items such as weights, swivels and leaders and an additional flotation device may be affixed to the backing.

In the preferred embodiment, the rolled lure caddy is adapted for receiving two auxiliary tackle receptacles which may be used for storing large or bulky items such as rain gear, extra fishing line and reels. The auxiliary tackle receptacles are releasably secured to the rolled lure caddy in saddlebag fashion thus allowing transport as a single unit. Hand and shoulder straps may be provided for easy carrying.

A primary object of the present invention is to provide a new and improved fishing tackle storage apparatus that has a lure mounting pad fabricated from a foamed elastomeric flotation material having a closed cell structure so that the fishing tackle storage apparatus will remain buoyant and be easily retrievable in case of accidental loss in water.

Another object of the invention is to provide an improved fishing tackle storage apparatus that can be made compact for transport and storage.

Still another object of the invention is to provide an improved fishing tackle storage apparatus that may be readily adapted for storing fishing paraphernalia such as rain gear as well as fishing tackle such as reels, sinkers, line and lures.

These and other objects of the invention will become apparent from the following detailed description of the invention when taken with the accompanying drawings.

BRIEF DESCRIPTION OF THE DRAWINGS

FIG. 4 is a perspective view of the lure caddy of FIG. 1 but with the auxiliary tackle receptacles removed;

FIG. 5 is a perspective view of the auxiliary tackle receptacles of FIG. 1; and

FIG. 6 is a transverse cross-sectional view of one of the auxiliary tackle receptacles of FIG. 5 taken along line 6—6.

DETAILED DESCRIPTION OF THE INVENTION

Figure 1:
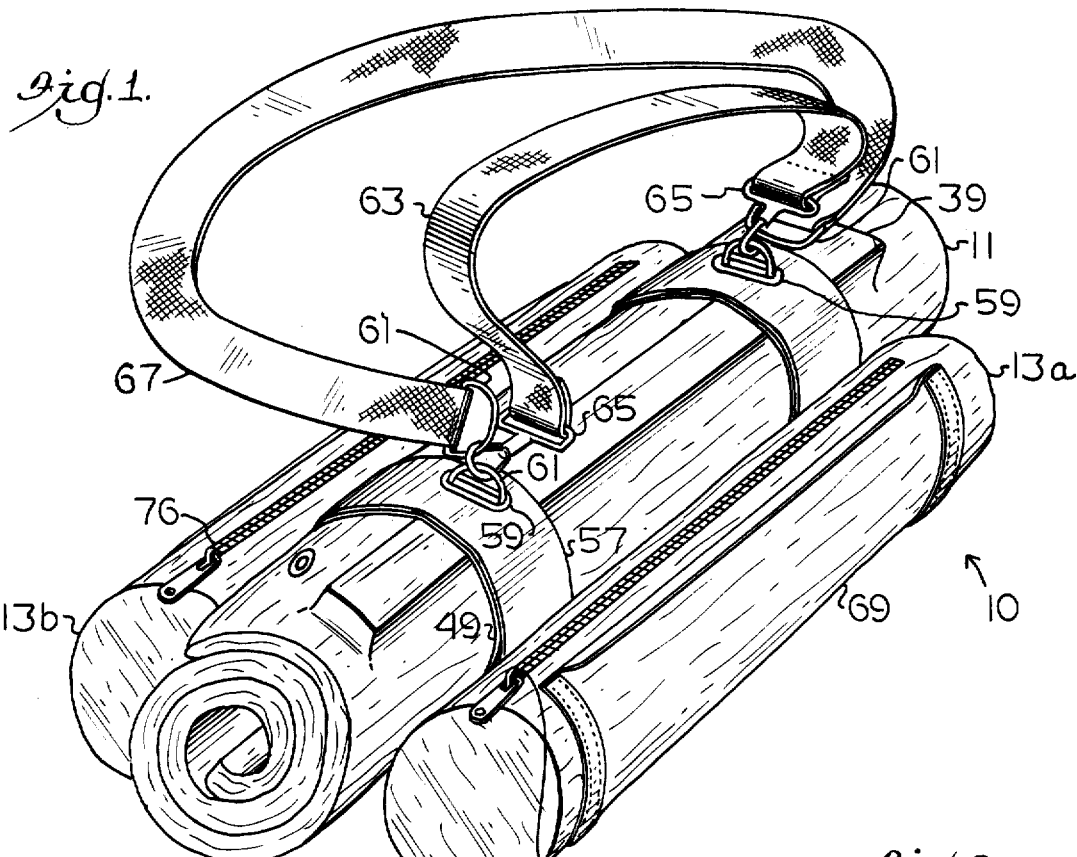
FIG. 1 is a perspective view of a lure caddy constructed in accordance with the present invention, rolled compact for transport and having auxiliary tackle receptacles mounted thereon in saddlebag fashion.

Referring now to the drawings there is shown one embodiment of an improved fishing tackle storage apparatus constructed in accordance with the present invention and indicated generally by reference numeral 10. As can be seen in FIG. 1 the improved apparatus 10 generally comprises a lure caddy 11 and a pair of identical auxiliary tackle receptacles 13a and 13b.

Figure 2:
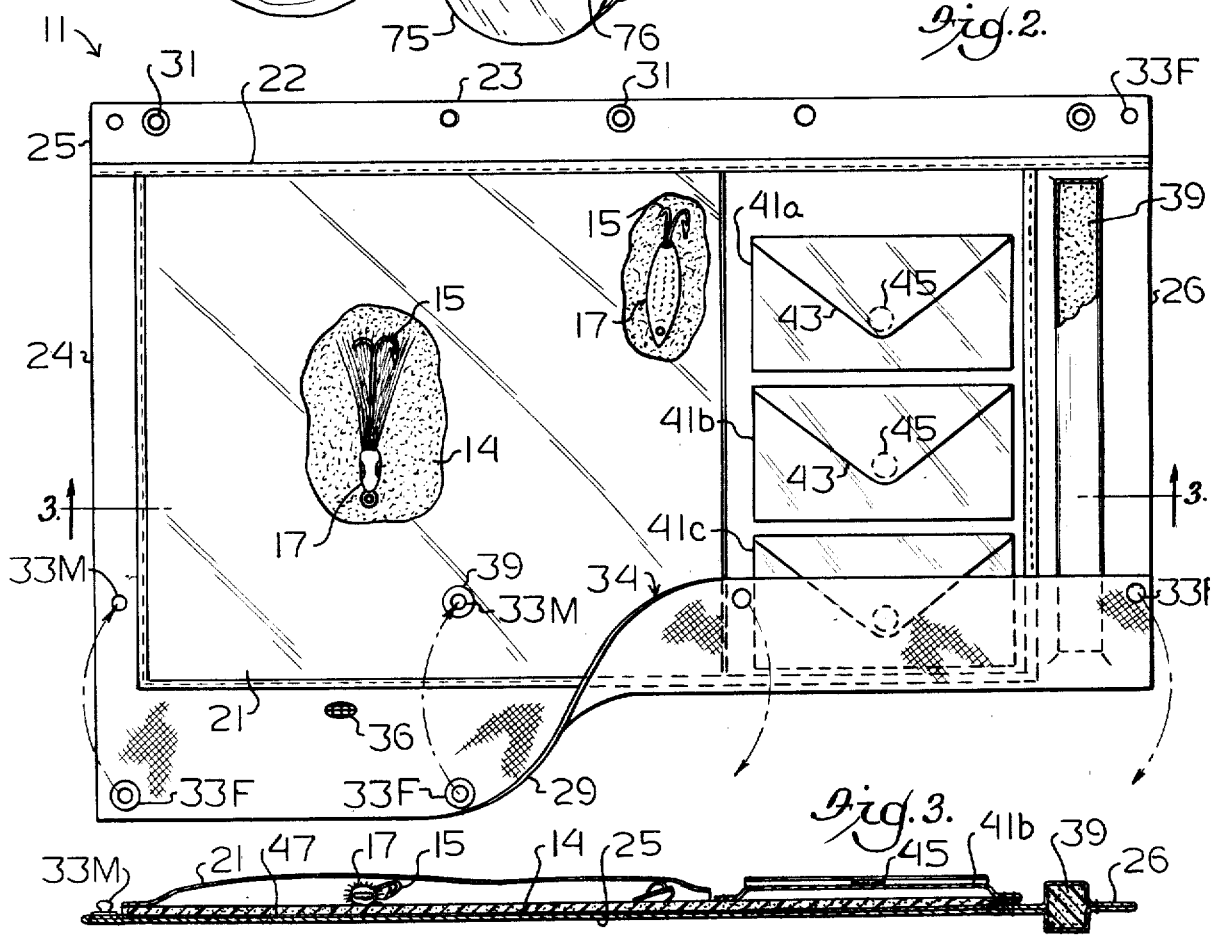
FIG. 2 is a plan view of the lure caddy of FIG. 1 in an unrolled generally flat condition and with portions broken away for clarity.
Figure 3:
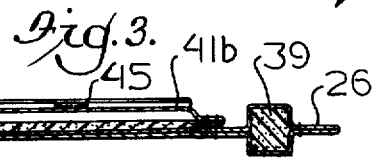
FIG. 3 is a transverse cross-sectional view taken substantially along line 3—3 of FIG. 2, looking in the direction of the arrows.

The lure caddy 11 is rollable on itself and includes a lure mounting pad 14 adapted for detachably recieving at least one hook 15 of a hook-type lure 17, (FIGS. 2 and 3). The lure mounting pad 14 is generally fabricated from a sheet of foamed elastomeric flotation material formed into a rectangular shape. The foamed elastomeric flotation material has a closed cell structure substantially impenetrable to water so that its buoyancy is retained. A protective cover flap 21, substantially resistant to hook penatration and preferrably transparent, is affixed along the top edge 22 of the lure mounting pad 14 to cover the exposed hooks 15 of mounted lures 17. In the preferred embodiment the lure mounting pad 14 is secured to a pliable backing 25 which is water- and soil-resistant.

The preferred lure mounting pad 14, is fabricated from a sheet of ETHAFOAM brand polyethylene foam sold by the Dow Chemical Company. ETHAFOAM has a closed cell structure with cell sizes varying from about 1.0 to about 1.4 mm. It is available in several forms including planks, sheets and bars. Because it has a closed cell structure the water absorption of ETHAFOAM is only about 0.2 to about 0.4 percent by volume. Its low density provides a buoyancy in water of about 60 pounds per cubic foot (in sheet form). The high buoyancy and low water absorption of ETHAFOAM allow the lure caddy 11 to remain afloat indefinitely even when heavily laden with tackle. ETHAFOAM is also highly resistant to tearing and will remain usable for a prolonged period even though the hooks 15 of the lures 17 are often inserted past the barb. A sheet thickness of about ¼ inch will accomodate most hook sizes.

The backing 25 is preferably fabricated from a soil- and water-resistant material. Excellent materials have been found to be 500–1,000 denier nylon that may have an optional urethane coating. This material has the advantages of being very resistant to soil, water and wear yet is very light in weight. Of course, other materials such as reinforced polyethylene sheet may be used to fabricate the backing 25. Polyethylene sheet can be "heat sealed" so that need for stitching or sewing of the backing 25 can be eliminated.

In the illustrated embodiment, the lure caddy 11 is preferably rectangular in its unrolled generally flat condition and may measure approximately 24×34 inches along its edges. The backing 25 is cut slightly larger so that the edges may be doubled over forming top 23, side 24, 26 and bottom 29 panels. Top panel 23 has a plurality of grommets 31 to facilitate mounting the lure caddy 11 on the side of a boat, for example, by tying with a cord so that the lures 17 can be displayed to the fisherman. Similarly, the lure caddy 11 may be mounted by the use of conventional snaps. In the drawings, the female members of the snaps have been designated 33F and the male members 33M. Snaps are commercially available that have a threaded stud 35 (FIG. 4) affixed to their male member 33M. The threaded stud 35 may be screwed into the gunwale of the boat so that the lure caddy 11 can be easily mounted for fishing and later removed to prevent theft.

Bottom panel 29 is also fitted with a snaps 33F and 33M so that it may be folded up to form a gutter 34 as shown in FIG. 2. The cover flap 21 has a hole 39 to allow female snap member 33F to engage with male snap member 33M which is affixed to the lure mounting pad 14. Thus, should the hook 15 of a lure 17 become disengaged from the lure mounting pad 14, the gutter 34 will prevent the lure 17 from falling out of the lure caddy 11. It may be desirable to provide the gutter 34 with a small drain 36 so that the water from recently used lures or rain can escape from the mounted lure caddy 11.

Side panel 26 is made large enough to receive a flotation bar 39 to provide the lure caddy 11 with extra buoyancy. The flotation bar 39 is also fabricated from a foamed elastomeric material having a closed cell structure such as ETHAFOAM. The dimensions of the bar shown in the drawings are about 1½×1½×15 inches.

As shown in FIG. 2, the lure caddy 11 may be fitted with a plurality of tackle pockets such as shown at 41a, 41b and 41c that can be used for storing such items as sinkers and leaders. In the preferred embodiment, the pockets 41a-c are fabricated from vinyl and have flaps 43 that are secured closed by VELCRO tabs 45.

The lure caddy 11 may have an optional vinyl sheet 47 between the lure mounting pad 14 and the backing 25 (FIG. 2). This additional vinyl sheet 47 provides extra strength to the lure caddy 11 and helps prevent the hooks 15 of lures 17 from penetrating the backing 25.

With the lures in place as shown in FIG. 2 and with the bottom flap 29 folded in the upward position as shown in the right-hand portion of FIG. 2, the lure caddy 11 may be rolled into a compact cylindrical shape as shown in FIG. 4. A pair of straps 49, each of which has a free end 51 and a double bar slide buckle 53 at its opposite end, are attached along their middle portions to the backing 25 and used to secure the cylindrical shape of the rolled lure caddy 11. When thus rolled, the lures 17 as well as any tackle in the pockets 41 are retained for transport and storage.

In the preferred embodiment the rolled lure caddy 11 is adapted to receive a pair of auxiliary tackle receptacles 13a and 13b. The auxiliary tackle receptacles 13a and 13b are connected by straps 57 and may be used for carrying larger, bulkier items such as reels, extra line and rain gear. The straps 57 have oval shaped eyelets reinforced by a grommet 59 adapted for receiving metal D-rings 61 that have been attached to straps 49 of the lure caddy 11. Thus, the tackle receptacles 13a and 13b can be draped over the rolled lure caddy 11 in saddlebag fashion as shown in FIG. 1. A hand carrying strap 63 having a spring clasp 65 fastened at each end for engagement with D-rings 61 secures the tackle receptacles 13a and 13b to the lure caddy 11. An optional shoulder strap 67 also having D-rings 61 at each end can be secured to the lure caddy 11 with spring clasps 65. The tackle receptacles 13a and 13b can be fitted with exterior pockets 69 to provide extra storage space.

As shown in FIG. 6, each auxiliary tackle receptacle 13a and 13b is preferably formed in the shape of a barrel bag having a one-piece rectangular body panel 71 secured, as by sewing, at its opposite ends to circular end panels 75. Means for opening and closing the barrel-shaped tackle receptacles 13a and 13b are provided in the form of a slide fastener 76. The tackle receptacles 13a and 13b can be fabricated from the same material as the backing 25 of the lure caddy 11 and may, be compartmentalized by transversely fastened gussets 77 (shown only on 13b in FIG. 5).

Because the auxiliary tackle receptacles 13a and 13b are provided for storage of bulkier and heavier fishing tackle and paraphernalia such as reels and rain gear, additional flotation bars 39, also fabricated from a foamed elastomeric material having a closed cell structure, may be provided (shown only on 13a in FIG. 6). Thus, the tackle receptacles 13a and 13b will also remain buoyant if accidentally dropped in water. The interior of the auxiliary tackle receptacles 13a has a lateral gusset flap 79 secured about its edges 81 forming a pocket 83 that receives the flotation bars 39. The flotation bars 39 also provide the tackle receptacles with longitudinal rigidity so that stored items may be more easily inserted and removed.

It will be understood that while preferred embodiments of the present invention have been illustrated and described, various modifications may be made therein without departing from the invention in its broader aspects.

Various features of the invention are set forth in the following claims.

What is claimed is:

1. A fishing tackle storage apparatus comprising a primary storage apparatus including a lure mounting pad made from a foamed elastomeric material adapted for detachably receiving the hooks of a hook-type fishing lure, said foamed elastomeric flotation material having a closed cell structure substantially impenetrable to water so that its buoyancy is retained even when in contact with water for an extended period of time, a protective cover flap substantially resistant to hook penetration adapted to cover the lure mounting pad and associated hooks and being rollable with the lure mounting pad into a compact, generally cylindrical shape, a pliable and rollable backing secured to said lure mounting pad so as to overlie the surface thereof opposite the surface covered by said protective cover, fastener means mounted on said primary storage apparatus so as to project outwardly therefrom when said apparatus is in the form of a generally cylindrical shape, and including two substantially cylindrical shaped auxiliary tackle receptacles having clasp means thereon adapted for releasable attachment, in saddlebag fashion, to said fastener means on said primary storage apparatus when said primary apparatus is rolled into a generally cylindrical shape.

2. A fishing tackle storage apparatus comprising a pliable water and soil resistant backing sheet, a lure mounting pad of smaller size than said backing sheet and having at least two generally parallel edges, said mounting pad being mounted on said backing sheet so as to leave exposed marginal areas of said backing sheet adjacent said generally parallel edges of said pad, said lure mounting pad being made from an elastomeric flotation material and having an exposed surface adapted for detachably receiving the hooks of hook-type fishing lures, a protective cover flap substantially resistant to hook penetration mounted along one edge thereof to one of said marginal areas of said backing sheet and adapted to cover the lure mounting pad and hooks of fishing lures when mounted thereon, the other of said marginal areas of said backing sheet extending outwardly from said lure mounting pad and being foldable into a generally U-shape to define a gutter contiguous to said mounting pad and adapted to receive lures inadvertently disengaged from said mounting pad when disposed in generally upstanding relation, means releasably maintaining said other marginal area of said backing sheet in said U-shape so as to establish said gutter with a relatively shallow depth and with an open edge to receive disengaged lures and enable insertion of a user's fingers for removal of lures from said gutter while under direct visual observation, said backing sheet and said lure mounting pad being rollable into a compact generally cylindrical storage configuration while said other marginal area is in said U-shape, and means for releasably maintaining said apparatus in said rolled storage configuration.

3. Apparatus in accordance with claim 2 wherein said gutter has a drain opening.

4. Apparatus in accordance with claim 2 wherein said fishing tackle storage apparatus comprises a primary storage apparatus, and including at least one substantially cylindrical auxiliary tackle receptacle adapted for releasable attachment to said primary storage apparatus when said primary apparatus is rolled into a generally cylindrical shape.

5. Apparatus in accordance with claim 4 wherein said auxiliary tackle receptacle has a flotation bar fastened thereto and said flotation bar is fabricated from a foamed elastomeric flotation material having a closed cell structure.

6. Apparatus in accordance with claim 4 wherein said tackle receptacle comprises a barrel bag.

7. Apparatus in accordance with claim 6 wherein said barrel bag has a transversely fastened gusset for forming compartments within said barrel bag.

8. Apparatus in accordance with claims 1 or 3 wherein said foamed elastomeric flotation material is polyethylene.

9. A fishing tackle storage apparatus as defined in claim 2 wherein said other marginal area of said backing sheet at least partially overlies said mounting pad when in said folded U-shape.

10. A fishing tackle storage apparatus as defined in claim 2 including means cooperative with said backing sheet and said cover flap to releasably retain said cover flap in a position covering said lure mounting pad.

11. A fishing tackle storage apparatus as defined in claim 2 including a vinyl sheet substantially resistant to hook penetration interposed between said backing sheet and said lure mounting pad.

* * * * *